(12) United States Patent
Takamatsuya (10) Patent No.: US 7,448,069 B2
(45) Date of Patent: Nov. 4, 2008

(54) ACCESS-REQUEST CONTROL METHOD, DRIVER PROGRAM FOR COMMUNICATION DEVICE, AND COMMUNICATION DEVICE

(75) Inventor: Yoshihiro Takamatsuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 633 days.

(21) Appl. No.: 11/050,687

(22) Filed: Feb. 7, 2005

(65) Prior Publication Data

US 2005/0144461 A1  Jun. 30, 2005

Related U.S. Application Data

(63) Continuation of application No. PCT/JP02/11452, filed on Nov. 1, 2002.

(51) Int. Cl.
*H04L 9/00* (2006.01)
*G06F 15/16* (2006.01)

(52) U.S. Cl. .............. 726/3; 726/16; 726/17; 713/182; 709/218

(58) Field of Classification Search ............ 726/3, 726/16–17; 713/182; 709/203, 328, 218, 709/223–225; 370/257
See application file for complete search history.

(56) References Cited

U.S. PATENT DOCUMENTS

| 4,982,430 | A | | 1/1991 | Frezza et al. | |
|---|---|---|---|---|---|
| 5,765,021 | A | * | 6/1998 | Hsu et al. | 710/8 |
| 6,389,542 | B1 | * | 5/2002 | Flyntz | 726/17 |
| 6,553,441 | B1 | * | 4/2003 | Wang et al. | 710/64 |
| 6,636,690 | B1 | | 10/2003 | Fukushima et al. | |
| 6,940,614 | B2 | | 9/2005 | Subramaniam | |
| 6,947,970 | B2 | * | 9/2005 | Berry | 709/212 |
| 2003/0023774 | A1 | * | 1/2003 | Gladstone et al. | 709/328 |
| 2003/0041160 | A1 | * | 2/2003 | Sandman et al. | 709/231 |
| 2003/0158974 | A1 | * | 8/2003 | Herrod et al. | 709/328 |

FOREIGN PATENT DOCUMENTS

| EP | 200704 | 12/1986 |
|---|---|---|
| EP | 1017050 | 7/2000 |
| EP | 1071004 | 1/2001 |
| JP | 61-248636 | 11/1986 |
| JP | WO 97/34399 | 9/1997 |
| JP | 10-177488 | 6/1998 |
| JP | 2000-156034 | 6/2000 |
| JP | 2001-36636 | 2/2001 |
| JP | 2001-503887 | 3/2001 |
| JP | 2001-236299 | 8/2001 |
| JP | 2001-337917 | 12/2001 |
| JP | 2002-232554 | 8/2002 |
| WO | WO 00/24192 | 4/2000 |

OTHER PUBLICATIONS

Japanese Patent Office Action, mailed May 20, 2008 and issued in corresponding Japanese Patent Application No. 2004-548007.

\* cited by examiner

*Primary Examiner*—Minh Dieu Nguyen
(74) *Attorney, Agent, or Firm*—Staas & Halsey LLP (57) ABSTRACT

An access-request control method of controlling an access request from an application to a communication device, to which at least a general-purpose port is allocated, that performs a communication via a communication network in response to the access request, includes permitting a utilization of the communication device prior to the access request from the application; and controlling whether to accept the access request to the communication device from the application, based on a permission status for the utilization of the communication device.

9 Claims, 10 Drawing Sheets

ACCESS FROM SPECIFIED APPLICATION

FIG.1A

ACCESS FROM SPECIFIED APPLICATION

FIG.1B

ACCESS FROM ANOTHER APPLICATION

FIG.6A
ACCESS FROM SPECIFIED APPLICATION

FIG.6B
ACCESS FROM ANOTHER APPLICATION

ACCESS FROM SPECIFIED APPLICATION

FIG.9B

ACCESS FROM ANOTHER APPLICATION

FIG.10

ACCESS-REQUEST CONTROL METHOD, DRIVER PROGRAM FOR COMMUNICATION DEVICE, AND COMMUNICATION DEVICE

This application is a continuing application, filed under 35 U.S.C. §111(a), of International Application PCT/JP02/11452, filed Nov. 1, 2002.

BACKGROUND OF THE INVENTION

1) Field of the Invention

The present invention relates to an access-request control method of controlling requests from respective applications to access to a communication device to which at least a general-purpose port is allocated and which responds to the access requests from the applications so as to communicate with the applications via a communication network, a driver program for a communication device, and the communication device. More particularly, the present invention relates to an access-request control method of permitting an access to the communication device where the general-purpose port is allocated only to a specified application of the applications so as to prevent a false access or an improper access from another application to the communication device, a driver program for a communication device, and the communication device.

2) Description of the Related Art

Conventionally, a Windows (registered trademark)-installed personal computer (PC) include a communication (COM) port (serial port) as a general-purpose port, and devices referred to as PC cards such as a modem card having a modem function and a wireless communication card having a wireless communication function are allocated to the COM port.

When a PC card is allocated to the COM port, various applications that are actuated on Windows can access to the PC card via the COM port. For example, when a modem card is connected to the PC and is allocated to a COM2 port, a general-purpose application that uses a modem such as a HyperTerminal can access to the modem card via the COM2 port.

When, however, all the applications are set so as to access to the PC card allocated to the COM port because the COM port is the general-purpose port, problems arise when a certain application erroneously accesses to the PC card or an improper application accesses to the PC card. Specifically, conventional PC cards and device drivers (serial drivers) for the PC cards cannot check the type of the application that accesses to the PC cards via the COM port. Therefore, even an application that is not permitted to access to the PC cards can access to the PC cards via the COM port.

Serious problems may arise with PC cards having a multi-access function of simultaneously establishing voice communication and packet communication. Specifically, when such a PC card is connected to a PC, a COM port is allocated to the PC card, and a website is browsed by using the packet communication of the PC card, if an improper application that is described by Java (registered trademark, same applies hereinafter) script is downloaded from the website, automatic dial-up connection is established via the PC card by actuation of the improper application, and a user is later charged for an unintended telephone bill.

SUMMARY OF THE INVENTION

It is an object of the present invention to solve at least the above problems in the conventional technology.

An access-request control method according to one aspect of the present invention, which is for controlling an access request from an application to a communication device, to which at least a general-purpose port is allocated, that performs a communication via a communication network in response to the access request, includes permitting a utilization of the communication device prior to the access request from the application; and controlling whether to accept the access request to the communication device from the application, based on a permission status for the utilization of the communication device.

A computer-readable recording medium according to another aspect of the present invention stores a driver program for a communication device, to which at least a general-purpose port is allocated, that performs a communication via a communication network in response to an access request from an application. The driver program causes a computer to execute the above method according to the present invention.

A communication device according to still another aspect of the present invention, to which at least a general-purpose port is allocated, that performs a communication via a communication network in response to an access request from an application, includes a utilization permitting unit that permits a utilization of the communication device prior to the access request from the application; and a control unit that controls whether to accept the access request to the communication device from the application, based on a permission status for the utilization of the communication device.

The other objects, features, and advantages of the present invention are specifically set forth in or will become apparent from the following detailed description of the invention when read in conjunction with the accompanying drawings.

DETAILED DESCRIPTION

Exemplary embodiments of an access-request control method, a driver program for a communication device, and the communication device according to the present invention will be explained in detail with reference to the accompanying drawings.

Figure 1A:
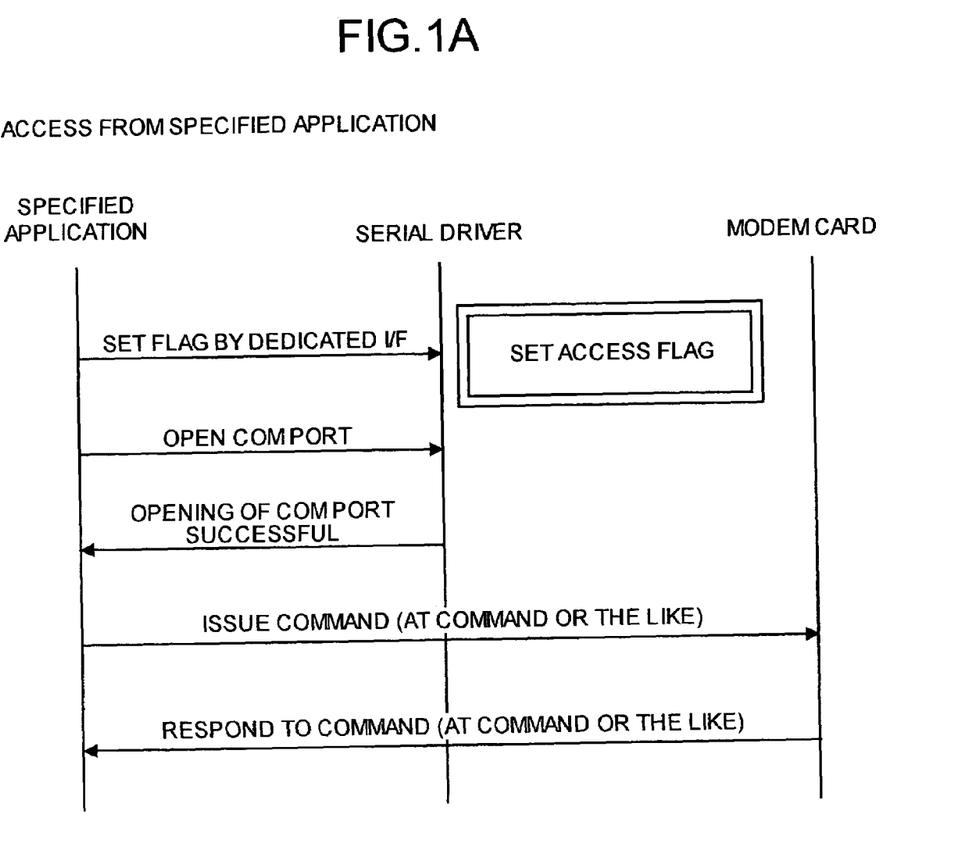
FIGS. 1A and 1B are explanatory diagrams of the concept of a permission to access to a COM port connecting device according to a first embodiment.
Figure 1B:
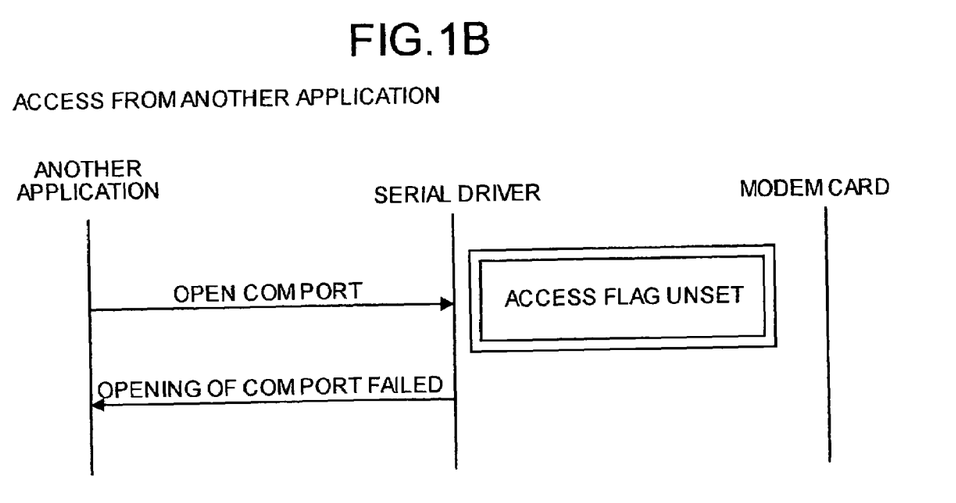

FIGS. 1A and 1B are explanatory diagrams of the concept of the permission to access to the COM port connecting device according to a first embodiment of the present invention. In the drawing, an access flag represents whether an access from an application to a modem card via the COM port is permitted. When the access flag is set, the access from the application to the modem card is permitted, and when the access flag is not set, the access from the application to the modem card is not permitted.

That is, as shown in FIG. 1A, before a specified application requests a serial driver to open the COM port in order to use a modem card, it requests setting of the access flag using an exclusive interface (I/F). After the access flag is set, when the specified application requests the opening of the COM port and the serial driver checks the access flag, the access flag is set. Accordingly, the COM port is opened, and the serial driver informs the specified application of the success in the opening of the COM port. The specified application issues an AT command or the like so as to start communication using the modem card.

On the contrary, as shown in FIG. 1B, when another application tries to establish a false access or an improper access to the modem card, the application requests the serial driver to open the COM port, and the serial driver checks the access flag. Since the access flag is not set, the opening process for the COM port is not executed, and the serial driver informs the application of failure in the opening of the COM port.

According to the first embodiment, the access flag that represents whether the access to the modem card is permitted is provided in the serial driver, and only when the access flag is set, the opening of the COM port is succeeded. Accordingly, only the specified application that presets the access flag can access to the modem card via the COM port, so that a false access or an improper access from another application to the modem card can be prevented.

Figure 2:
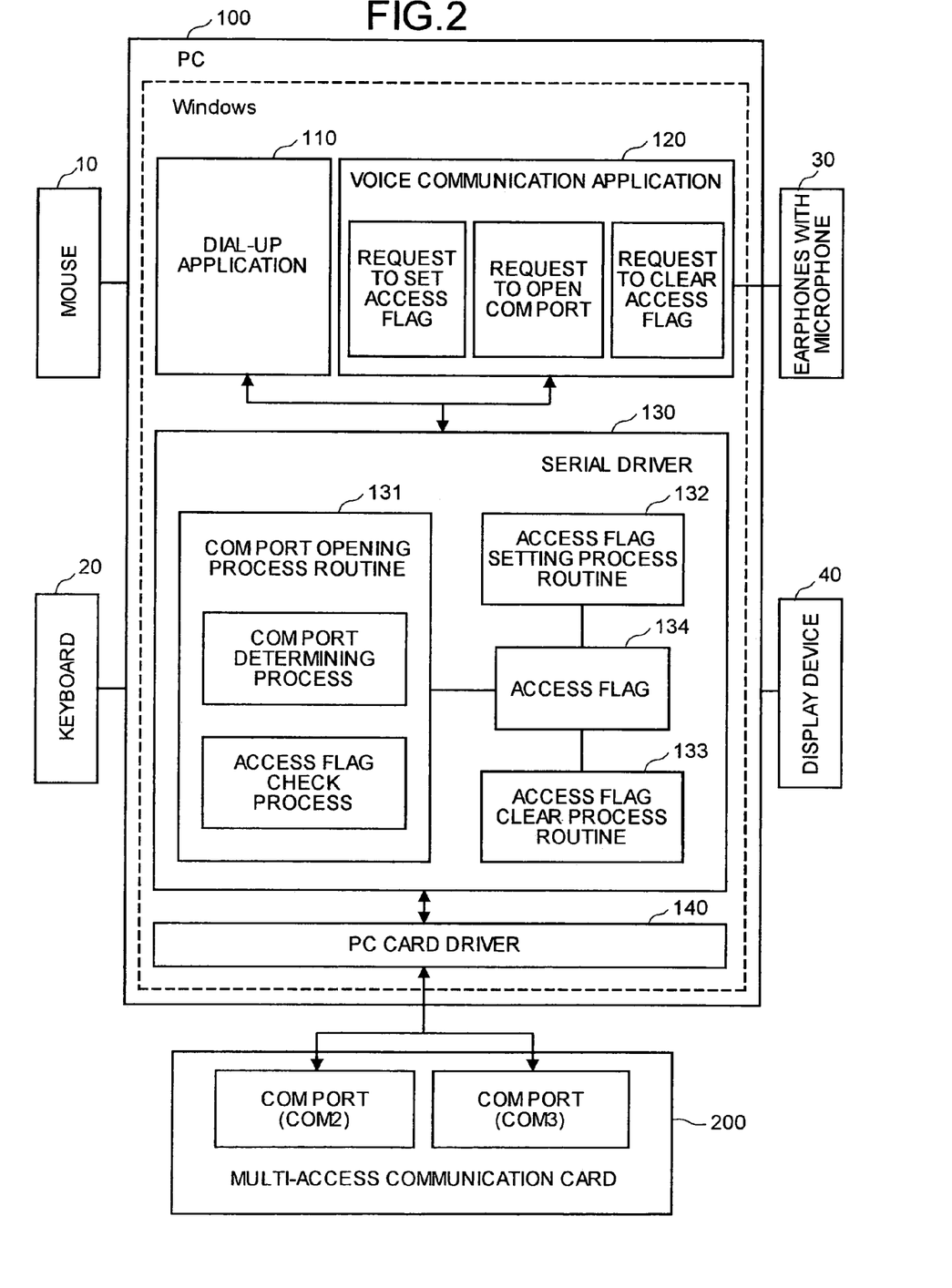
FIG. 2 is a functional block diagram of a configuration of a multi-access device according to the first embodiment.

The multi-access device can simultaneously establish voice communication and packet communication. FIG. 2 is a functional block diagram of the configuration of the multi-access device according to the first embodiment. As shown in FIG. 2, the multi-access device has a PC 100, a multi-access communication card 200, a mouse 10, a keyboard 20, earphones with microphone 30, and a display device 40.

The PC 100 is a computer installed with Windows, and realizes a multi-access function using the multi-access communication card 200. Specifically, a data communication application and a voice communication application are executed simultaneously, so that the multi-access function is realized.

The multi-access communication card 200 is a PC card that enables the PC 100 to simultaneously establish packet communication and voice communication using a mobile communication network, and has a modem and two COM ports to be connected to the modem. The two COM ports are designated by a COM2 port and a COM3 port, and the COM2 port is used for the packet communication and the COM3 port is used for the voice communication. The access to the multi-access communication card 200 via the COM3 port is limited only to an application that establishes the voice communication. This limitation prevents automatic telephone connection made by a false access or an improper access from another application to the multi-access communication card 200 and thus prevents a telephone communication that is not intended by a user.

The mouse 10 is a device that specifies an arbitrary position on a display screen, and is used for selecting an application window, a menu, or the like. The keyboard 20 is a device that inputs instructions and data into the PC 100, and is used for writing e-mails, inputting URLs, telephone numbers, and the like.

The earphones with microphone 30 is a device that inputs/outputs voices into/from the PC 100, and is used for inputting/outputting voices into/from an application for the voice communication. The display device 40 displays an output from the PC 100, and is used for displaying contents of e-mails, web screens, a voice communication screen, and the like.

As shown in FIG. 2, the PC 100 has a dial-up application 110, a voice communication application 120, a serial driver 130, and a PC card driver 140. The PC 100 has a web browser using dial-up connection, an application program for e-mail software or the like, communication libraries such as Transmission Control Protocol/Internet Protocol (TCP/IP) and Point to Point Protocol (PPP) for the dial-up connection, and a program for a device driver or the like of the earphones with microphone 30, not shown.

The dial-up application 110 is for establishing the dial-up connection, and establishes data communication using the COM2 port of the multi-access communication card 200.

The voice communication application 120 is for establishing the voice communication using the earphones with microphone 30, and establishes communication with the modem via the COM3 port of the multi-access communication card 200. Before the voice communication application 120 requests the serial driver 130 to open the COM3 port, it requests the setting of the access flag representing whether an access to the COM3 port is permitted. After the COM3 port is closed, the voice communication application 120 requests clearing of the access flag.

The serial driver 130 is a processor that establishes serial communication of the dial-up application 110 and the voice communication application 120 with the multi-access communication card 200 via the COM port. The serial driver 130 has a COM port opening process routine 131, an access flag setting process routine 132, an access flag clear process routine 133, and an access flag 134. The serial driver 130 has an interruption process routine that processes interruption from the multi-access communication card 200, a Read process routine and a Write process routine that exchange data with the multi-access communication card 200, a Plug aNd Play (PnP) process routine that realizes a plug-and-play function, a Power process routine that manages a power source, and the like, not shown.

The COM port opening process routine 131 is a processor that opens the COM ports according to a request from an application, and determines whether the COM port to be opened is the COM3 port. When it is the COM3 port, this routine executes the opening process only when the access flag 134 is set. On the other hand, when the COM port to be opened is not the COM3 port, the routine unconditionally executes the opening process.

The COM port opening process routine 131 checks the access flag 134, and only when the access flag 134 is set, the COM3 port is opened. Therefore, a false access or an improper access from another application to the multi-access communication card 200 via the COM3 port can be prevented.

The access flag setting process routine 132 is a processor that sets the access flag 134, and is used by the voice communication application 120. Specifically, the access flag setting process routine 132 is called by using DeviceIoControl.

The access flag clear process routine 133 is a processor that clears the access flag 134, and is used by the voice communication application 120. The access flag clear process routine 133 is called by using DeviceIoControl similarly to the access flag setting process routine 132.

The access flag 134 is a storage unit that stores information about whether the access to the multi-access communication card 200 via the COM3 port is permitted. When the access flag 134 is set, the access to the multi-access communication card 200 is permitted, and when the access flag 134 is not set, the access to the multi-access communication card 200 is not permitted. When the access flag 134 stores the information about the permission or inhibition of the access to the multi-access communication card 200 via the COM3 port, a control can be made so that only the voice communication application 120 can access to the multi-access communication card 200 via the COM3 port.

The PC card driver 140 is a processor that manages PC cards so that an application can utilize the PC cards, and specifically manages a state of a PC card slot and an interruption level.

Figure 3:
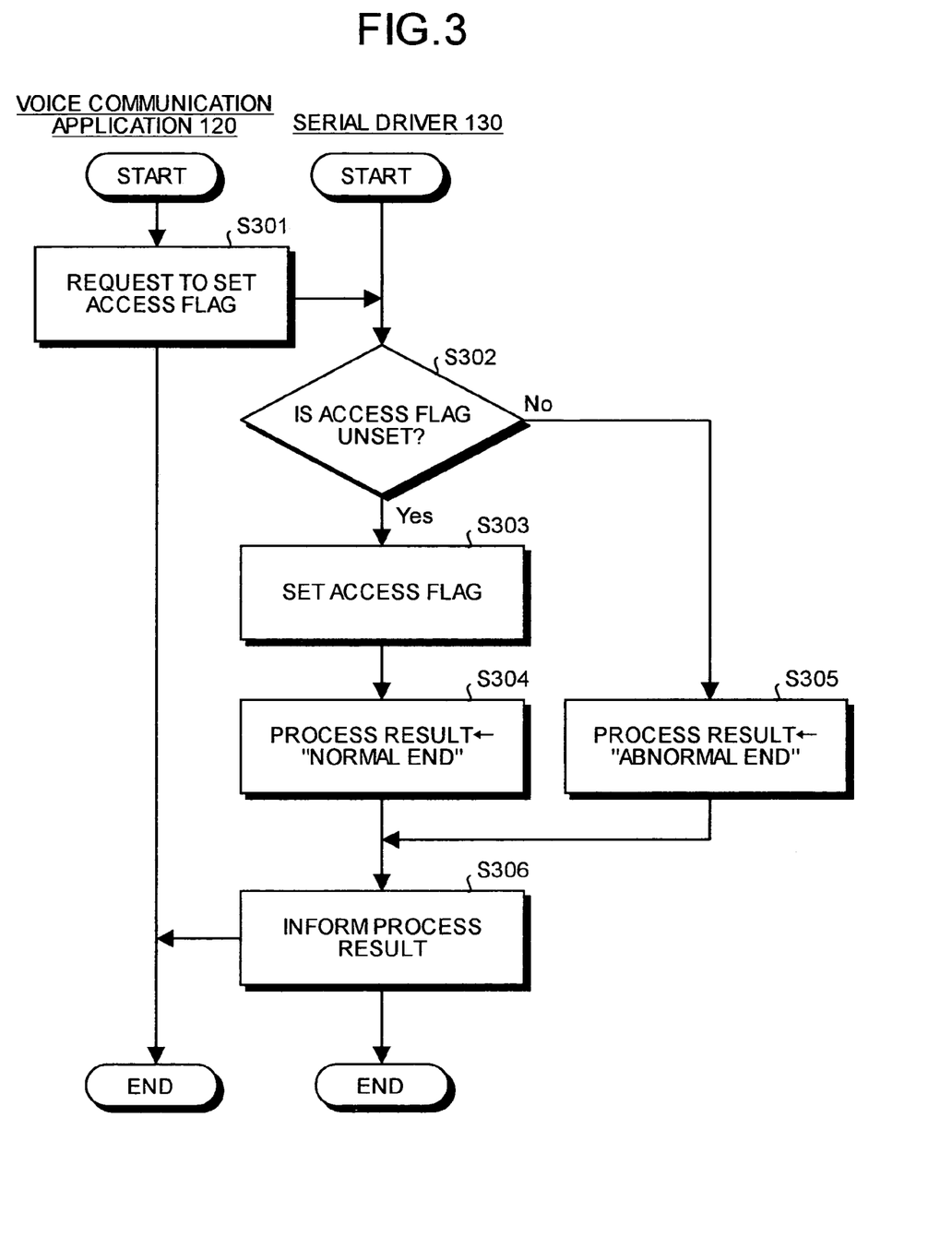
FIG. 3 is a flowchart of a procedure of an access flag setting process by the multi-access device shown in FIG. 2.

FIG. 3 is a flowchart of the procedure of the access flag setting process by the multi-access device shown in FIG. 2. As shown in FIG. 3, in the multi-access device, before the voice communication application 120 requests the serial driver 130 to open the COM3 port, it requests the setting of the access flag 134 (step S301). The voice communication application 120 can make this request directly to the serial driver 130 using DeviceIoControl.

The serial driver 130, which accepts the request to set the access flag 134, checks whether the access flag 134 is already set (step S302), and when the access flag 134 is not set, sets the access flag 134 (step S303). The serial driver 130 sets "normal end" in the process result (step S304), and informs the voice communication application 120 of the process result (step S306). On the other hand, when the access flag 134 is already set, some kind of error is occurring. Therefore, the serial driver 130 sets "abnormal end" in the process result (step S305), and informs the application of this process result (step S306).

The voice communication application 120 requests the serial driver 130 to set the access flag 134 before requesting the opening of the COM3 port. Therefore, a restriction can be placed so that only the voice communication application 120 can access to the multi-access communication card 200 via the COM3 port.

Figure 4:
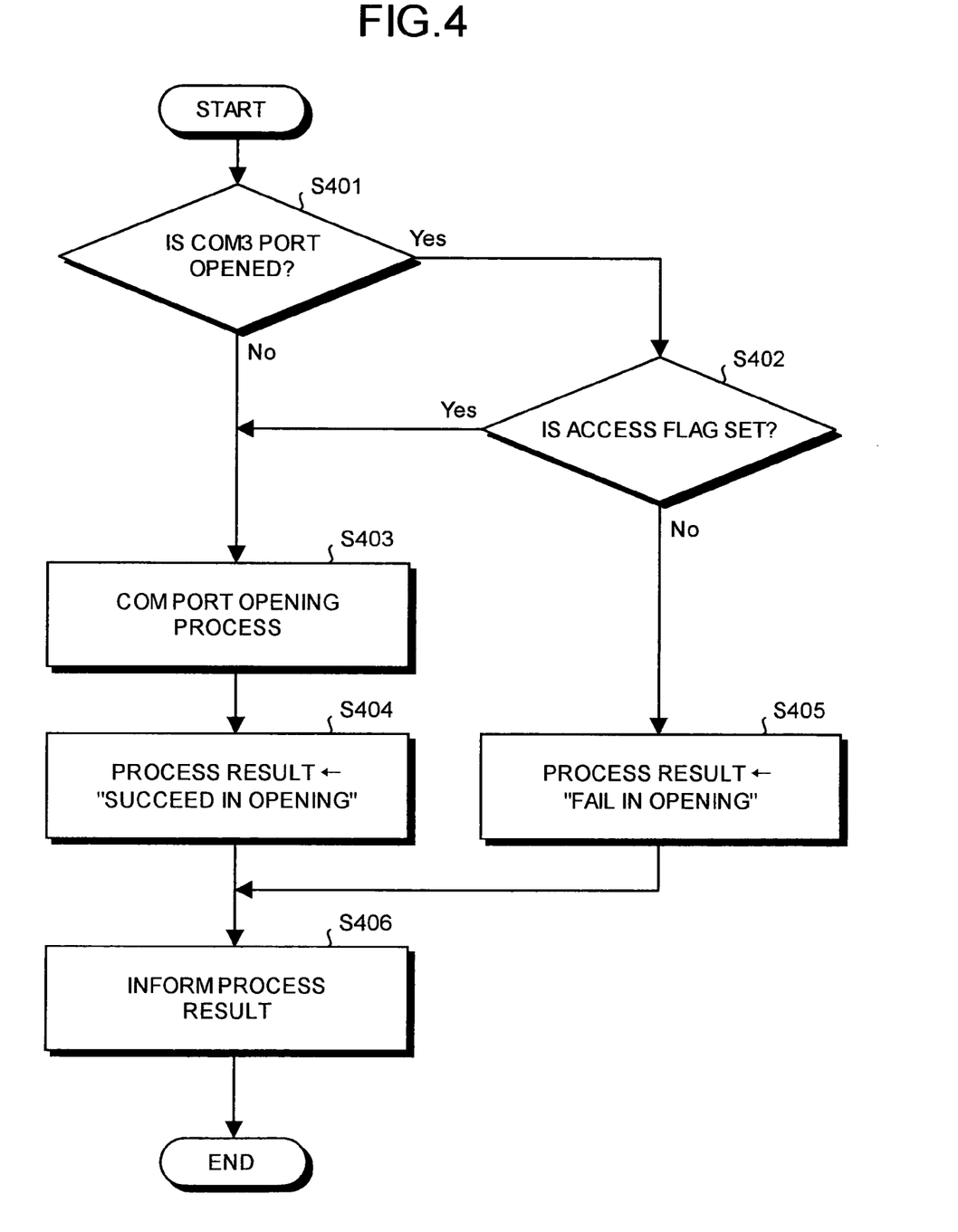
FIG. 4 is a flowchart of a procedure of a COM port open process routine shown in FIG. 2.

FIG. 4 is a flowchart of the procedure of the COM port opening process routine 131 shown in FIG. 2. As shown in FIG. 4, when the application requests the opening of the COM port, the COM port opening process routine 131 checks whether the COM port to be opened is the COM3 port (step S401). When the COM port to be opened is the COM3 port, the COM port opening process routine 131 checks whether the access flag 134 is set (step S402). When the access flag 134 is set, the routine 131 determines that it is the request to open the COM3 port from the voice communication application 120, and executes the opening process for the COM3 port (step S403). The COM port opening process routine 131 sets "succeed in opening" in the process result (step S404), and informs the application of this process result (step S406).

On the other hand, when the access flag 134 is not set, the COM port opening process routine 131 determines the request is a false opening request or an improper opening request of the COM3 port from another application. The routine 131 sets "fail in opening" in the process result (step S405) without executing the COM3 port opening process, and informs the application of this process result (step S406). When the COM port to be opened is not the COM3 port, the sequence proceeds to step S403 so that the COM port opening process is executed.

The COM port opening process routine 131 checks whether the COM port requested to be opened is the COM3 port in response to the request to open the COM port from the application. When the COM port to be opened is the COM3 port, the routine 131 further checks the access flag 134, and only when the access flag 134 is set, the routine 131 opens the COM3 port. Therefore, the use of the COM3 port can be limited only to the voice communication application 120 that presets the access flag 134.

Figure 5:
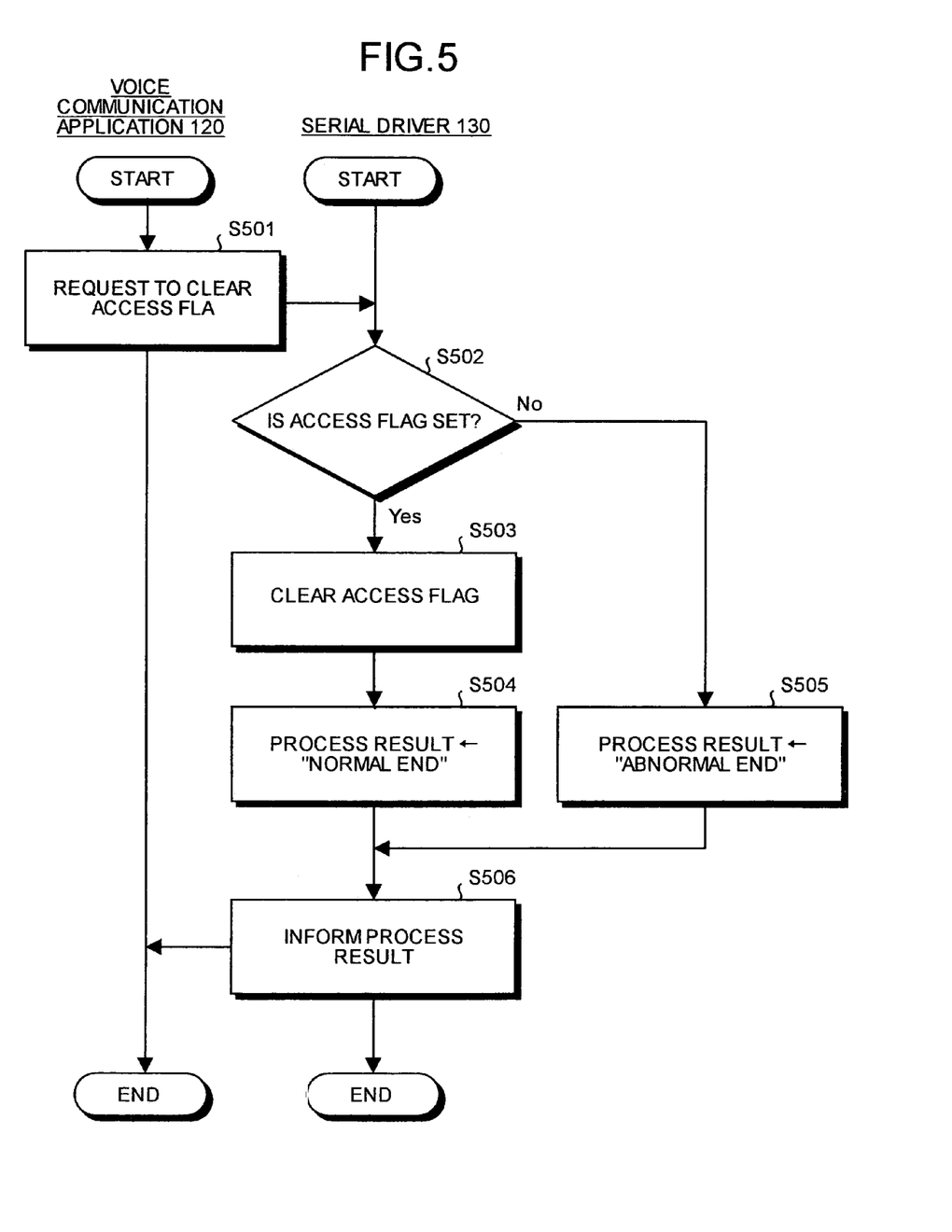
FIG. 5 is a flowchart of a procedure of an access flag clear process by the multi-access device shown in FIG. 2.

FIG. 5 is a flowchart of the procedure of the access flag clear process by the multi-access device shown in FIG. 2. As shown in FIG. 5, in the multi-access device, when the voice communication application 120 ends the use of the COM3 port, it requests the serial driver 130 to clear the access flag 134 (step S501). The voice communication application 120 can make this request directly to the serial driver 130 using DeviceIoControl similarly to the request to set the access flag 134.

The serial driver 130, which accepts the request to clear the access flag 134, checks whether the access flag 134 is set (step S502), and when the access flag 134 is set, it clears the access flag (step S503). The serial driver 130 sets "normal end" in the process result (step S504), and informs the voice communication application 120 of this process result (step S506). On the other hand, when the access flag 134 is not set, since the request to clear the access flag 134 has a problem, the serial driver 130 sets "abnormal end" in the process result (step S505), and informs the application of this process request (step S506).

According to the first embodiment, the access flag 134 that represents whether the access to the multi-access communication card 200 via the COM3 port is permitted is provided in the serial driver 130. The voice communication application 120, which accesses to the multi-access communication card 200, sets the access flag 134 before requesting for opening of the COM3 port. The COM port opening process routine 131 checks the access flag 134 in response to the request to open the COM port from the application, and only when the access flag 134 is set, it opens the COM3 port. Accordingly, only the voice communication application 120 is permitted to access to the multi-access communication card 200, so that false access and improper access to the multi-access communication card 200 from another application can be prevented.

According to the first embodiment, the COM port opening process routine 131 determines whether the access flag 134 representing the permission to access to the multi-access communication card 200 via the COM3 port is set. The determination of the access flag can be, however, made by units other than the COM port opening process routine 131. According to a second embodiment of the present invention, the multi-access device determines the access flag using a command to be transmitted to the multi-access communication card 200 by the application after the opening of the COM port is succeeded instead of at the time of the COM port opening process routine.

Figure 6A:
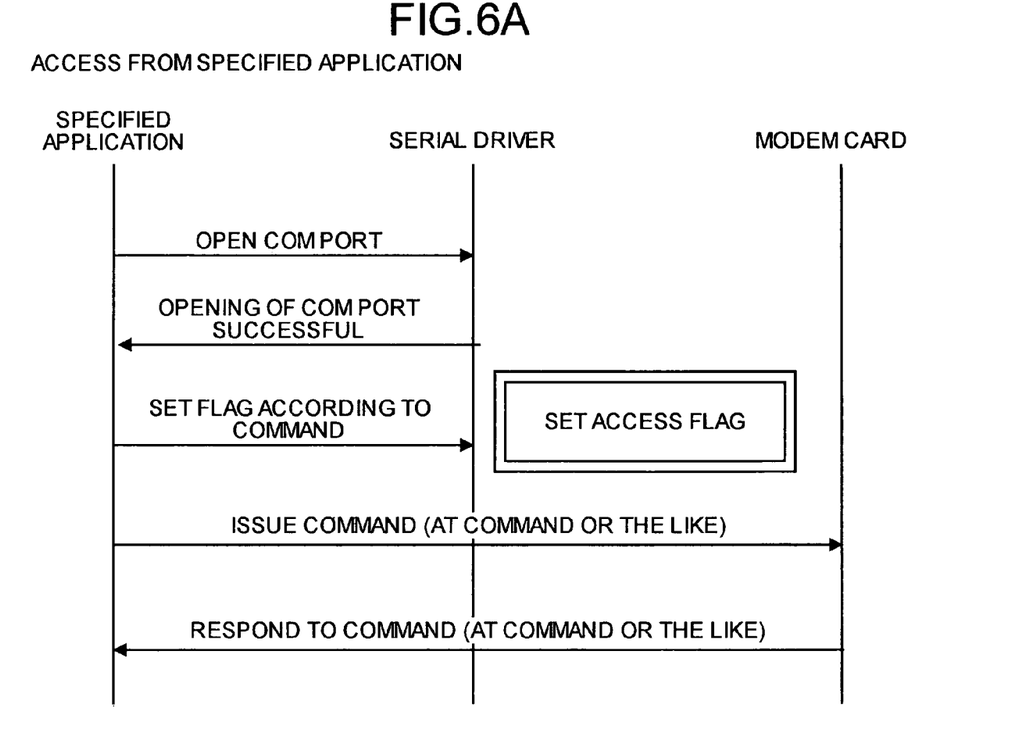
FIGS. 6A and 6B are explanatory diagrams of the concept of a permission to access to a COM port connecting device according to a second embodiment.
Figure 6B:
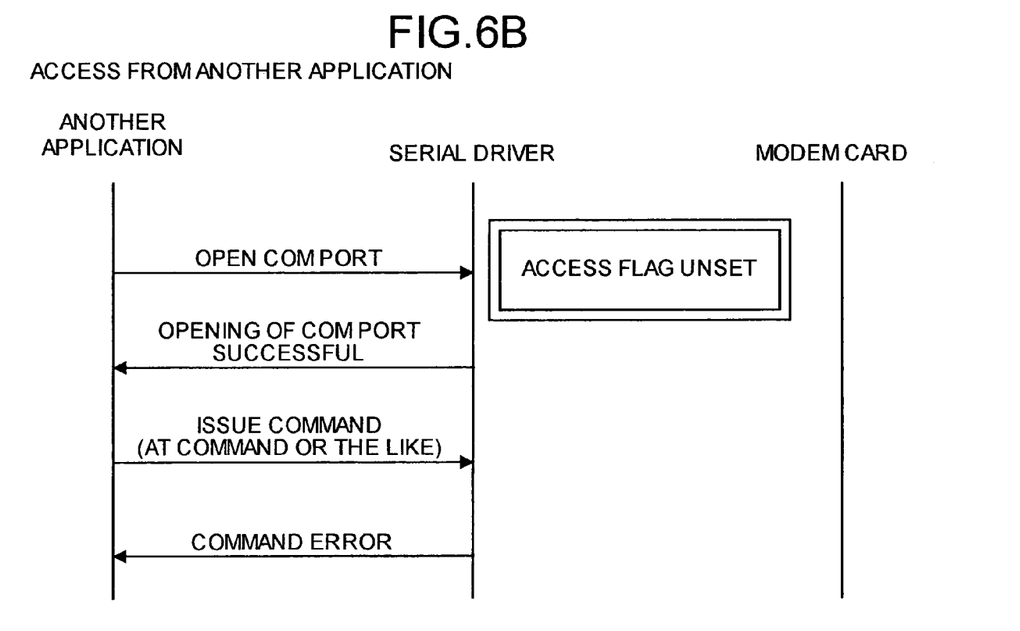

FIGS. 6A and 6B are explanatory diagrams of the concept of the permission to access to the COM port connecting device according to the second embodiment.

As shown in FIG. 6A, a specified application requests the serial driver to open a normal COM port in order to use a modem card. When the opening of the COM port is succeeded, the access flag is set by using a command to the modem card. The access flag is set after the COM port is opened here, but the access flag can be set before the COM port is opened.

The specified application issues an AT command or the like, and the serial driver that receives the AT command or the like checks the access flag. Since the access flag is set, the serial driver transmits the issued command to the modem card, so that the specified application can establish communication using the modem card.

On the contrary, as shown in FIG. 6B, when another application tries to establish a false access or an improper access to the modem card, the application requests the serial driver to open the COM port, and issues the AT command or the like after the opening of the COM port is succeeded. When the serial driver that receives the AT command or the like checks the access flag, the access flag is not set, and thus the serial driver returns a command error to the application.

According to the second embodiment, the access flag representing whether the access to the modem card is permitted is provided in the serial driver, and the serial driver transmits the command to the modem card only when the access flag is set. When the access flag is not set, the serial driver returns the command error to the application. Accordingly, only the specified application that presets the access flag can access to the modem card via the COM port, so that a false access or an improper access to the modem card from another application can be prevented.

Figure 7:
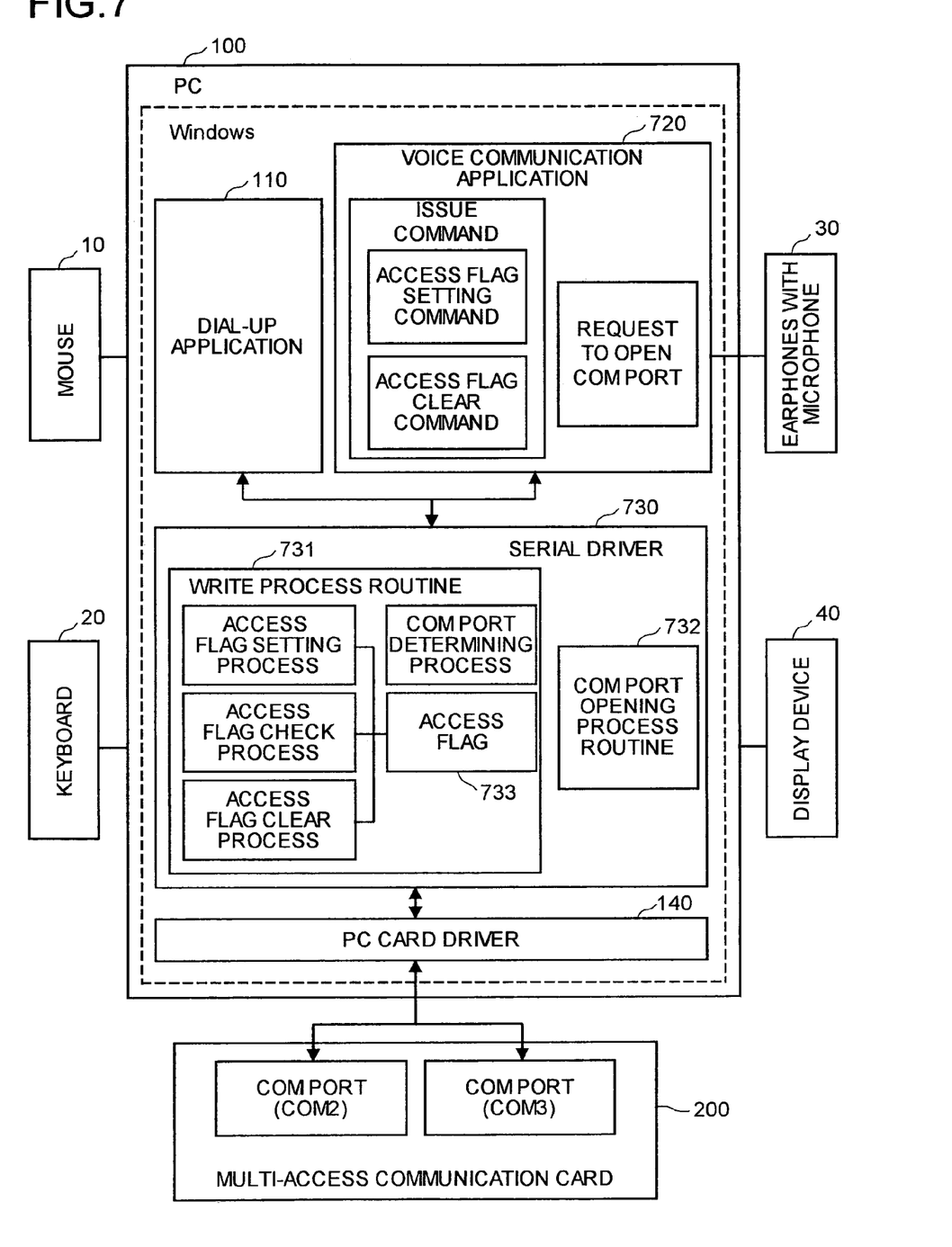
FIG. 7 is a functional block diagram of a configuration of a multi-access device according to the second embodiment.

FIG. 7 is a functional block diagram of the configuration of the multi-access device according to the second embodiment. For convenience of the explanation, like reference numerals designate like functional units that fulfill the similar functions to the respective units shown in FIG. 2, and their detailed explanation is omitted.

As shown in FIG. 7, the PC 100 has the dial-up application 110, a voice communication application 720, a serial driver 730, and the PC card driver 140.

After the opening of the COM3 port is succeeded, the voice communication application 720 issues an access flag setting command to the serial driver 730. After setting the access flag, the voice communication application 720 issues the AT command or the like so as to establish the voice communication. When the voice communication is ended, after closing the COM3 port, the voice communication application 720 issues an access flag clear command so as to clear the access flag.

The serial driver 730 has a Write process routine 731 and a COM port opening process routine 732, and further has the interruption process routine, the Read process routine, the PnP process routine, the Power process routine, and the like, not shown.

The Write process routine 731 is a processor that transmits a command issued by an application to the multi-access communication card 200, and has an access flag 733. The Write process routine 731 determines a COM port to be used for transmitting the command issued by the application. When the COM port is the COM3 port, the Write process routine 731 checks the access flag 733, and transmits the command issued by the application to the multi-access communication card 200 only when the access flag 733 is set.

The Write process routine 731 checks the command issued by the application, and when the command is the access flag setting command, it sets the access flag 733. When the command is the access flag clear command, the Write process routine 731 clears the access flag 733.

The Write process routine 731 checks the COM port to be used for transmitting the command to the multi-access communication card 200 from the application. When the COM port is the COM3 port, the Write process routine 731 further checks the access flag 733, and transmits the command to the multi-access communication card 200 only when the access flag 733 is set. Accordingly, a false access or an improper access to the multi-access communication card 200 from another application can be prevented.

The COM port opening process routine 732 is a processor that opens the COM port. Differently from the COM port opening process routine 131, the COM port opening process routine 732 does not make special checks such as whether the COM port to be opened is the COM3 port and whether the access flag is set.

Figure 8:
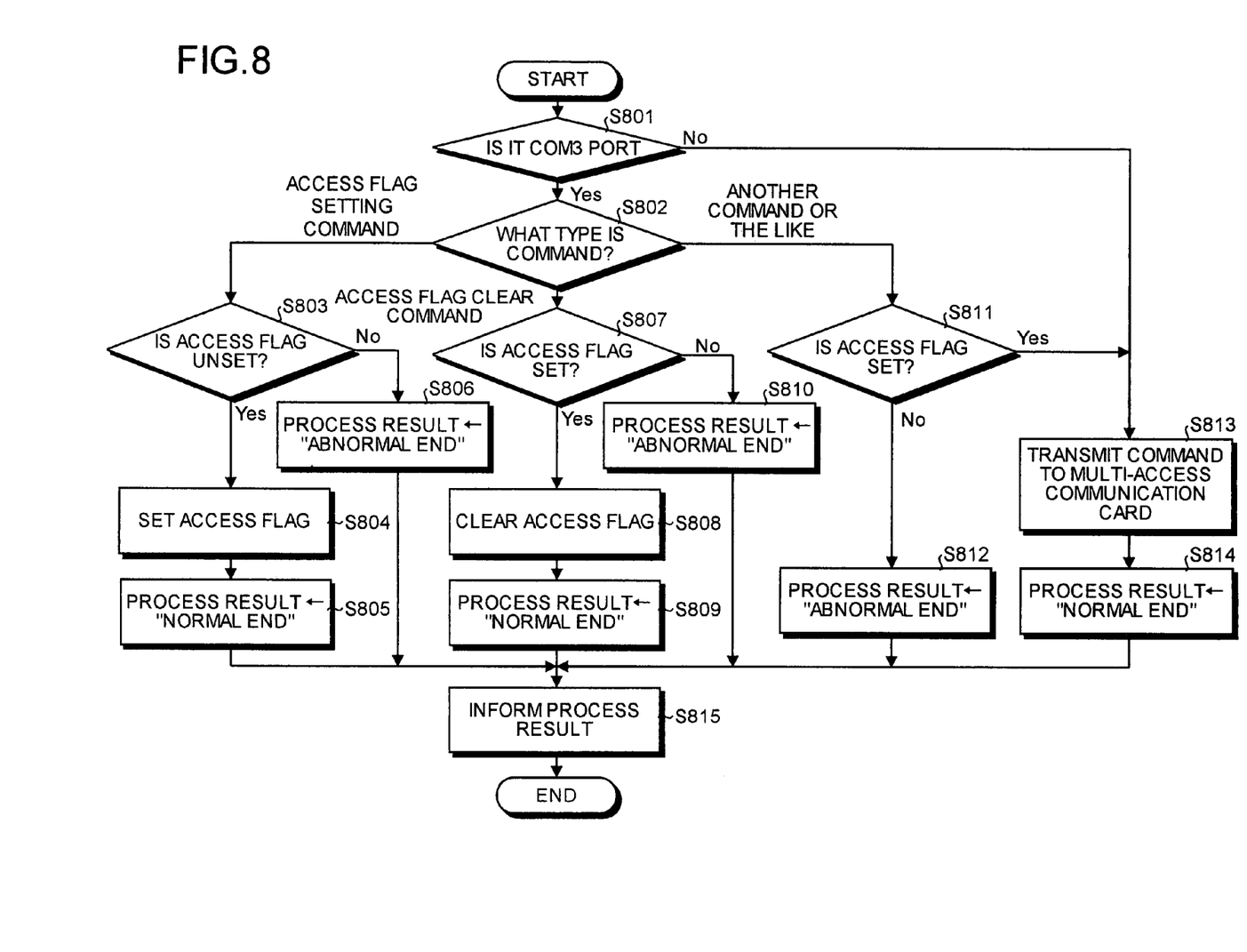
FIG. 8 is a flowchart of a procedure of a Write process routine.

FIG. 8 is a flowchart of the procedure of the Write process routine 731. As shown in FIG. 8, the Write process routine 731 checks whether the COM port to be output by the application is the COM3 port (step S801), and when it is the COM3 port, checks a command to the multi-access communication card 200 output from the application (step S802).

When the command output from the application is the access flag setting command, the Write process routine 731 further checks whether the access flag 733 is set (step S803). When the access flag 733 is not set, the Write process routine 731 sets the access flag 733 (step S804). The Write process routine 731 sets "normal end" in the process result (step S805), and informs the application of the process result (step S815). On the other hand, when the access flag 733 is set, some kind of error is occurring. Accordingly, the Write process routine 731 sets "abnormal end" in the process result (step S806) and informs the application of the process result (step S815).

When the command to the multi-access communication card 200 output from the application is the access flag clear command, the Write process routine 731 further checks whether the access flag 733 is set (step S807). When the access flag 733 is set, the Write process routine 731 clears the access flag 733 (step S808), and sets "normal end" in the process result (step S809) and informs the application of this process result (step S815). On the other hand, when the access flag 733 is not set, the Write process routine 731 sets "abnormal end" in the process result (step S810), and informs the application of this process result (step S815).

When the command to the multi-access communication card 200 output from the application is another command or the like, the Write process routine 731 checks whether the access flag 733 is set (step S811). When the access flag 733 is not set, the command is a false access or an improper access to the multi-access communication card 200 from another application. Accordingly, the Write process routine 731 sets "abnormal end" in the process result (step S812), and informs the application of this process result (step S815). On the other hand, when the access flag 733 is set, the command is the proper access to the multi-access communication card 200 from the voice communication application 720 via the COM3 port. Accordingly, the routine 731 transmits the command to the multi-access communication card 200 (step S813), sets "normal end" in the process result (step S814), and informs the voice communication application 720 of this process result (step S815).

According to the second embodiment, the voice communication application 720 requests the serial driver 730 to set the access flag using the command to the multi-access communication card 200. The Write process routine 731 of the serial driver 730 analyzes the command and sets the access flag 733. The voice communication application 720, thereafter, issues a command to the multi-access communication card 200 via the COM3 port. Accordingly, only the voice communication application 720 can access to the multi-access communication card 200, so that a false access or an improper access to the multi-access communication card 200 from another application can be prevented.

According to the first and the second embodiments, the access flag is provided in the serial driver, and the voice communication application sets the access flag so as to access to the multi-access communication card via the COM3 port. The access flag can be, however, provided in the multi-access communication card instead of the serial driver. According to a third embodiment of the present invention, the access flag is provided in the multi-access communication card.

Figure 9A:
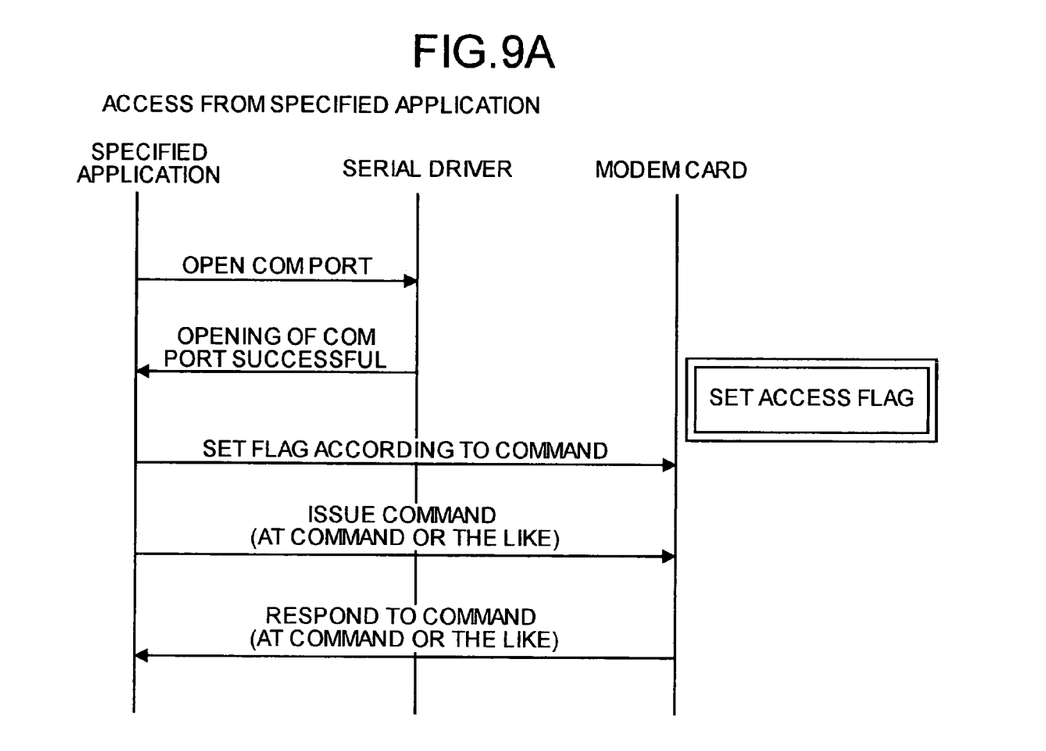
FIGS. 9A and 9B are explanatory diagrams of the concept of a permission to access to a COM port connecting device according to a third embodiment.
Figure 9B:
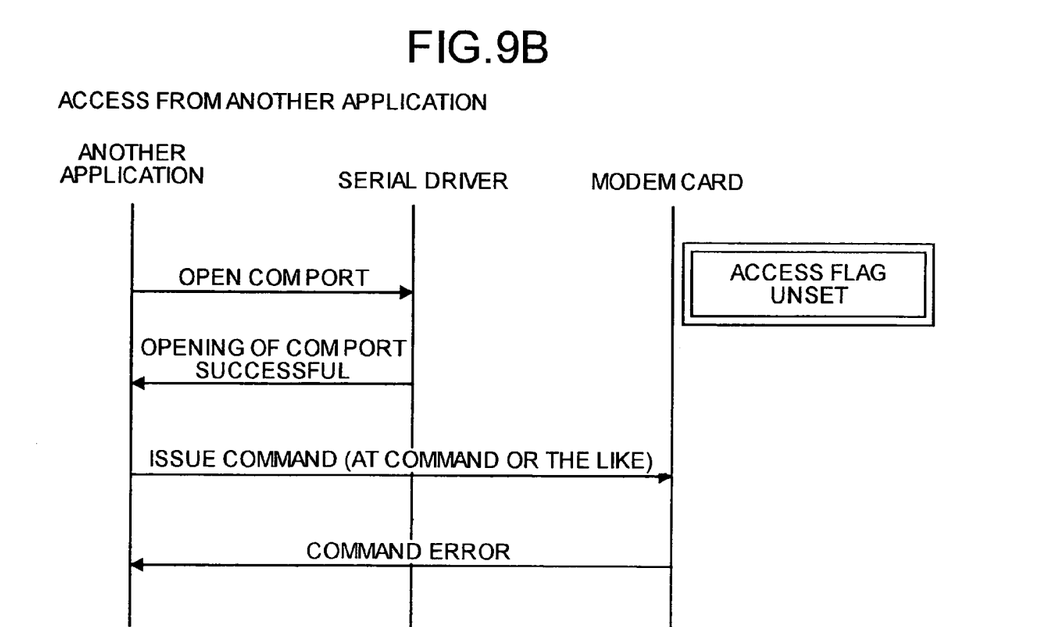

FIGS. 9A and 9B are explanatory diagrams of the concept of the permission to access to the COM port connecting device according to the third embodiment. As shown in FIG. 9A, a specified application requests the serial driver to normally open the COM port in order to use the modem card. When the opening of the COM port is succeeded, the application issues the access flag setting command to the modem card, and the modem card that receives the access flag setting command sets the access flag in the card.

The specified application issues the AT command or the like, and the modem card that receives the AT command or the like checks the access flag. Accordingly, the access flag is set, and thus the modem card executes the issued command.

On the contrary, as shown in FIG. 9B, when another application tries to establish a false access or an improper access to the modem card, the application requests the serial driver to open the COM port, and after the opening of the COM port is succeeded, issues the AT command or the like. When the modem card that receives the AT command or the like checks the access flag, it returns a command error to the application because the access flag is not set.

According to the third embodiment, the access flag is set in the modem card, and only when the access flag is set, the modem card executes the command transmitted from the application. When the access flag is not set, the modem card returns the command error to the application. Accordingly, only the specified application that presets the access flag can access to the modem card, so that a false access or an improper access to the modem card from another application can be prevented.

Figure 10:
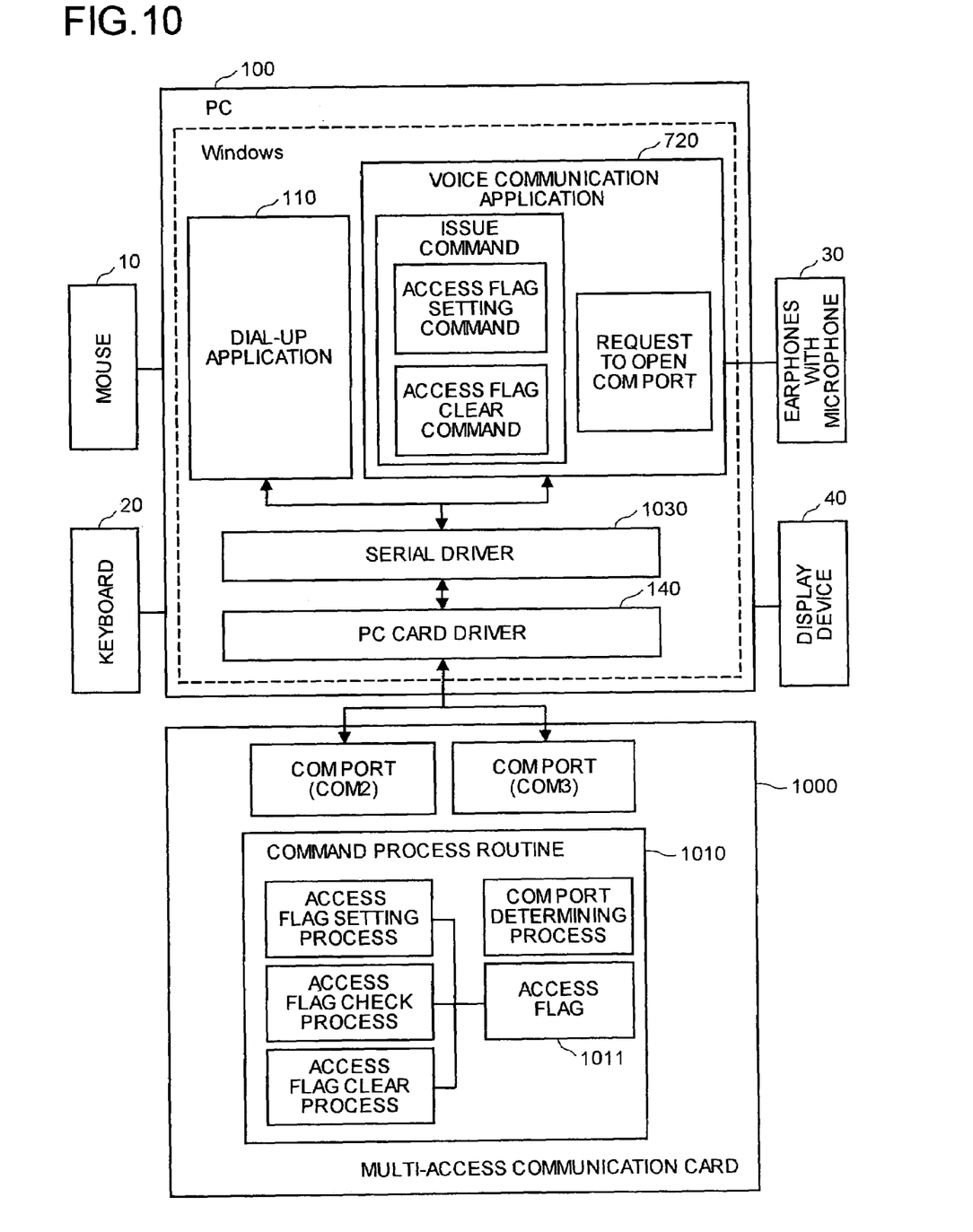
FIG. 10 is a functional block diagram of a configuration of a multi-access device according to the third embodiment.

FIG. 10 is a functional block diagram of the configuration of the multi-access device according to the third embodiment. For convenience of the explanation, like reference numerals designate like functional units that fulfill the similar functions to the respective units shown in FIGS. 2 and 7, and their detailed explanation is omitted.

As shown in FIG. 10, the multi-access device has the PC 100, a multi-access communication card 1000, the mouse 10, the keyboard 20, the earphones with microphone 30, and the display device 40. The PC 100 has the dial-up application 110, the voice communication application 720, a serial driver 1030, and the PC card driver 140.

Differently from the serial drivers 130 and 730, the serial driver 1030 does not execute special processes even when the COM port is the COM3 port.

The multi-access communication card 1000 has a command process routine 1010 in addition to the two COM ports. The command process routine 1010 is a processor that analyzes and executes a command issued by an application, and has an access flag 1011. The command process routine 1010 determines a COM port to be used by the application, and when the COM port to be used is the COM3 port, checks the access flag 1011. Only when the access flag 1011 is set, the command process routine 1010 executes the command issued by the application.

The command process routine 1010 checks the command issued by the application, and when the command is the access flag setting command, sets the access flag 1011. When the command is the access flag clear command, the command process routine 1010 clears the access flag 1011.

The command process routine 1010 checks the access flag 1011, and executes the command only when the access flag 1011 is set. Accordingly, a false access or an improper access to the multi-access communication card 1000 from another application can be prevented.

According to the third embodiment, the voice communication application 720 requests the multi-access communication card 1000 to set the access flag using a command, and the command process routine 1010 of the multi-access communication card 1000 analyzes the command so as to set the access flag 1011. The voice communication application 720, thereafter, issues the command to the multi-access communication card 1000 via the COM3 port so that only the voice communication application 720 can access to the multi-access communication card 1000. Accordingly, a false access or an improper access to the multi-access communication card 1000 from another application can be prevented.

According to the third embodiment, the command process routine 1010 and the access flag 1011 are provided in the multi-access communication card 1000, and the multi-access communication card 1000 limits the access to itself. Accordingly, the serial driver 1030 does not require a special process for the COM3 port, so that the serial driver does not have to be changed.

As described above, according to the present invention, prior to the request for an access from an application, the communication device is permitted to be used in response to the request from the application, and a control is made based on the permission/inhibition whether the request for the access to the communication device from the application is accepted. Accordingly, only a specified application among plural applications is permitted to access to the communication device to which a general-purpose port is allocated. Therefore, a false access or an improper access to the communication device from another application can be prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An access-request control method of controlling an access request from an application to a communication device, to which at least a general-purpose port is allocated, that performs a communication via a communication network in response to the access request, the access-request control method comprising:

permitting a utilization of the communication device prior to the access request from the application; and controlling whether to accept the access request to the communication device from the application, based on a permission status for the utilization of the communication device, wherein the permitting includes setting an access flag indicating a permission of an access to the communication device in response to a request to set the access flag from the application, the permitting includes permitting the utilization of the communication device before a general-purpose-port opening process, the controlling includes, when the access request is accepted from the application, controlling whether to accept the access request to the communication device from the application, based on whether the access flag is set for the application, and the controlling includes controlling whether to accept the access request to the communication device from the application as a part of the general-purpose-port opening process.

2. The access-request control method according to claim 1, wherein
the communication device can simultaneously perform a data communication and a voice communication, and
the permitting includes permitting a predetermined voice communication application to utilize the communication device.

3. The access-request control method according to claim 1, wherein the application makes the request to set the access flag using a dedicated command corresponding to an AT command for a modem in the communication device.

4. A computer-readable recording medium that stores a driver program for a communication device, to which at least a general-purpose port is allocated, that performs a communication via a communication network in response to an access request from an application, wherein the driver program makes a computer execute:
permitting a utilization of the communication device prior to the access request from the application; and
controlling whether to accept the access request to the communication device from the application, based on a permission status for the utilization of the communication device,
wherein the permitting includes setting an access flag indicating a permission of an access to the communication device in response to a request to set the access flag from the application,
the permitting includes permitting the utilization of the communication device before a general-purpose-port opening process,
the controlling includes, when the access request is accepted from the application, controlling whether to accept the access request to the communication device from the application, based on whether the access flag is set for the application, and
the controlling includes controlling whether to accept the access request to the communication device from the application as a part of the general-purpose-port opening process.

5. The computer-readable recording medium according to claim 4, wherein
the communication device can simultaneously perform a data communication and a voice communication, and
the permitting includes permitting a predetermined voice communication application to utilize the communication device.

6. The computer-readable recording medium according to claim 4, wherein the application makes the request to set the access flag using a dedicated command corresponding to an AT command for a modem in the communication device.

7. A communication device, to which at least a general-purpose port is allocated, that performs a communication via a communication network in response to an access request from an application, the communication device comprising:
a utilization permitting unit that permits a utilization of the communication device prior to the access request from the application; and
a control unit that controls whether to accept the access request to the communication device from the application, based on a permission status for the utilization of the communication device,
wherein the utilization permitting unit sets an access flag indicating a permission of an access to the communication device in response to a request to set the access flag from the application,
the utilization permitting unit permits the utilization of the communication device before a general-purpose-port opening process,
the control unit controls, when the access request is accepted from the application, whether to accept the access request to the communication device from the application, based on whether the access flag is set for the application, and
the control unit controls whether to accept the access request to the communication device from the application as a part of the general-purpose-port opening process.

8. The communication device according to claim 7, wherein
the communication device can simultaneously perform a data communication and a voice communication, and
the utilization permitting unit permits a predetermined voice communication application to utilize the communication device.

9. The communication device according to claim 7, wherein the application makes the request to set the access flag using a dedicated command corresponding to an AT command for a modem in the communication device.

* * * * *